United States Patent
Cunningham et al.

(10) Patent No.: US 10,914,371 B1
(45) Date of Patent: Feb. 9, 2021

(54) MULTI-PURPOSE REMOVABLE GEAR SHIFT KNOB

(71) Applicant: TOYOTA MOTOR ENGINEERING & MANUFACTURING NORTH AMERICA, INC., Plano, TX (US)

(72) Inventors: James D. Cunningham, Clarkston, MI (US); Scott L. Frederick, Brighton, MI (US); Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/782,820

(22) Filed: Feb. 5, 2020

(51) Int. Cl.
*F16H 59/02* (2006.01)
*G05G 25/00* (2006.01)
*G05G 1/06* (2006.01)

(52) U.S. Cl.
CPC ........... *F16H 59/0278* (2013.01); *G05G 1/06* (2013.01); *G05G 25/00* (2013.01)

(58) Field of Classification Search
CPC ....... F16H 59/0278; G05G 1/06; G05G 25/00
See application file for complete search history.

(56) References Cited

U.S. PATENT DOCUMENTS

| | | | | |
|---|---|---|---|---|
| 2006/0096406 | A1* | 5/2006 | Liu | F16H 59/0278 74/543 |
| 2009/0213603 | A1* | 8/2009 | Lin | B60Q 3/283 362/491 |

FOREIGN PATENT DOCUMENTS

| | | | | |
|---|---|---|---|---|
| CN | 2189037 | Y | 2/1995 | |
| CN | 201208730 | * | 3/2009 | ............. B25B 23/00 |
| CN | 202937789 | * | 5/2013 | ............. F16H 59/02 |
| CN | 105333124 | A | 2/2016 | |
| CN | 105443743 | A | 3/2016 | |
| CN | 106809079 | A | 6/2017 | |
| DE | 2916883 | A1 | 11/1980 | |
| DE | 4226009 | A1 | 2/1994 | |
| FR | 2965767 | A1 | 4/2012 | |

OTHER PUBLICATIONS

Derwent image of CN202937789, May 15, 2013.*
Derwent image of CN201208730, Mar. 18, 2009.*
Secret compartment shift knob (http://www.realcoolgadgets.com/secret-compartment-shift-knob/); Dec. 18, 2019.
Pilot Automotive PM-2104 44 Magnum Six Shooter Shift Knob w Secret Storage Compartment, Manual/Automatic Transmission (https://www.amazon.in/Pilot-Automotive-Compartment-Automatic-Transmission/dp/B000HTS5JC); Dec. 18, 2019.

* cited by examiner

*Primary Examiner* — Vicky A Johnson
(74) *Attorney, Agent, or Firm* — Dinsmore & Shohl LLP

(57) ABSTRACT

Embodiments disclosed herein relate to a multi-purpose removable gear shift knob disposed on a gear shift lever in a vehicle. In one aspect, a removable gear shift knob includes a body comprising a central aperture for receiving the gear shift lever and a plurality of compartments disposed around the central aperture. An individual compartment of the plurality of compartments is configured to hold one or more accessories, where the one or more accessories are selected from: one or more screwdriver bits, one or more light emitting diodes (LED), and a battery.

8 Claims, 4 Drawing Sheets

US 10,914,371 B1

MULTI-PURPOSE REMOVABLE GEAR SHIFT KNOB

TECHNICAL FIELD

The present specification generally relates to multi-purpose automobile components and, more specifically to, a multi-purpose removable gear shift knob disposed on a gear shift lever in a vehicle.

BACKGROUND

Gear shift knobs are presently shaped and sized to provide an object for a user to grasp when shifting a gear shift lever in a vehicle. Gear shift knobs may be located within the vehicle cabin in a vicinity of a driver's seat, such as, for example, adjacent to the central instrument panel and/or adjacent to the steering wheel. Gear shift knobs are generally integrated with a shift lever such that the gear shift knobs are typically not removable from the vehicle. Further, gear shift knobs generally do not have any use other than to provide an object for a user to grasp when shifting.

SUMMARY

The present specification relates to a multi-purpose removable gear shift knob disposed on a gear shift lever in a vehicle. In one aspect, a removable gear shift knob includes a body having a central aperture for receiving the gear shift lever and a plurality of compartments disposed around the central aperture. An individual compartment of the plurality of compartments holds one or more accessories selected from: one or more screwdriver bits, one or more light emitting diodes (LED), and a battery.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Various embodiments described herein are directed to a multi-purpose removable gear shift knob disposed on a gear shift lever in a vehicle. The removable gear shift knob can be used for multiple purposes. In the embodiments shown and described in this disclosure, the removable gear shift knob is reconfigurable as a flashlight and/or a storage component for a set of tools that can be easily accessed when needed. In some embodiments, the set of tools may include; for example; a flat head screwdriver bit, a Phillips screwdriver bit, a hex head screwdriver bit, a Torx screwdriver bit, and/or the like. Various other aspects of the disclosure and variations thereof are illustrated or implied through the descriptions of the embodiments below.

Figure 1:
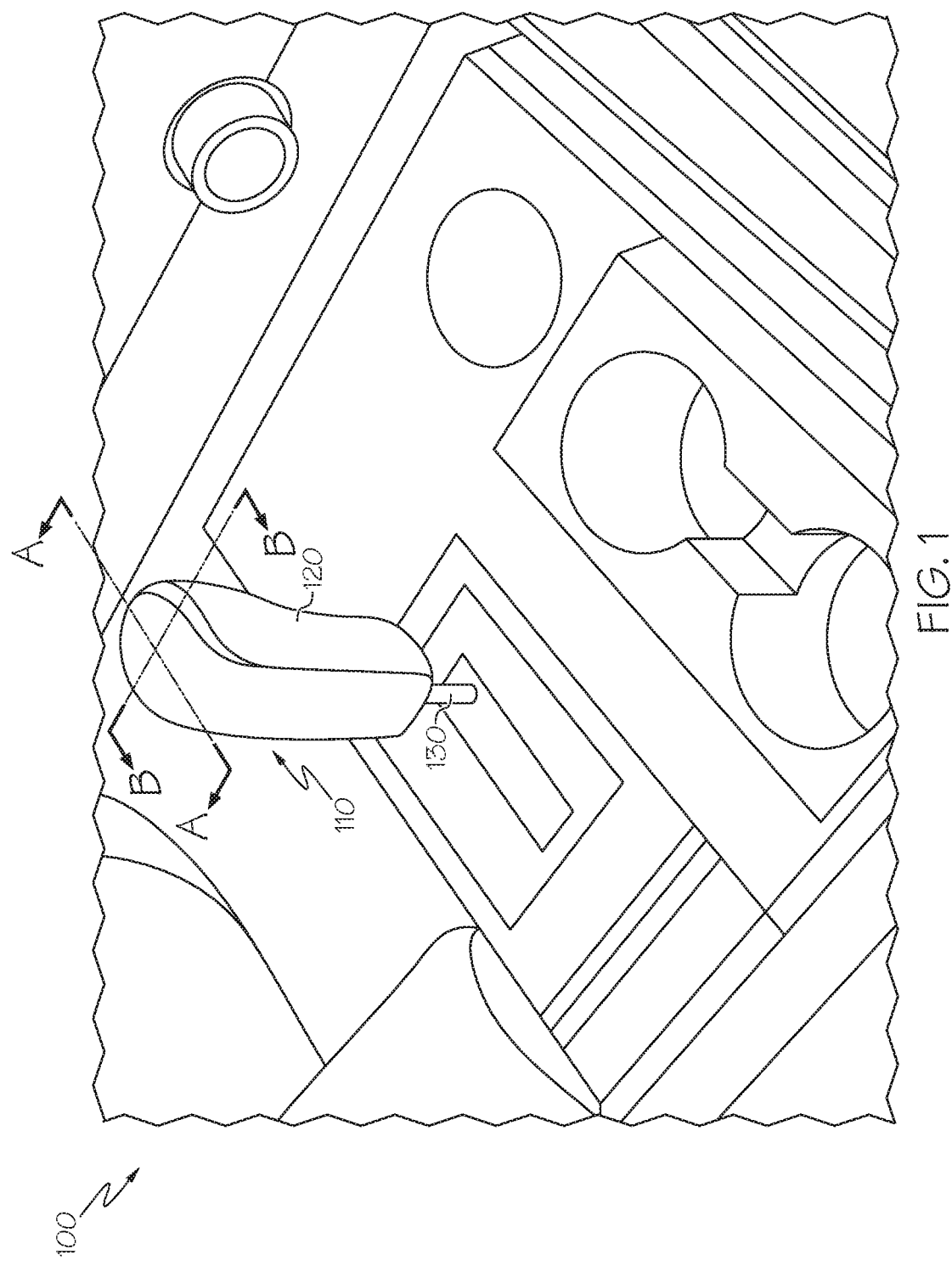
FIG. 1 depicts a perspective view of a gear shift knob assembly located within a vehicle and having a removable gear shift knob, according to one or more embodiments shown and described herein.
Figure 2A:
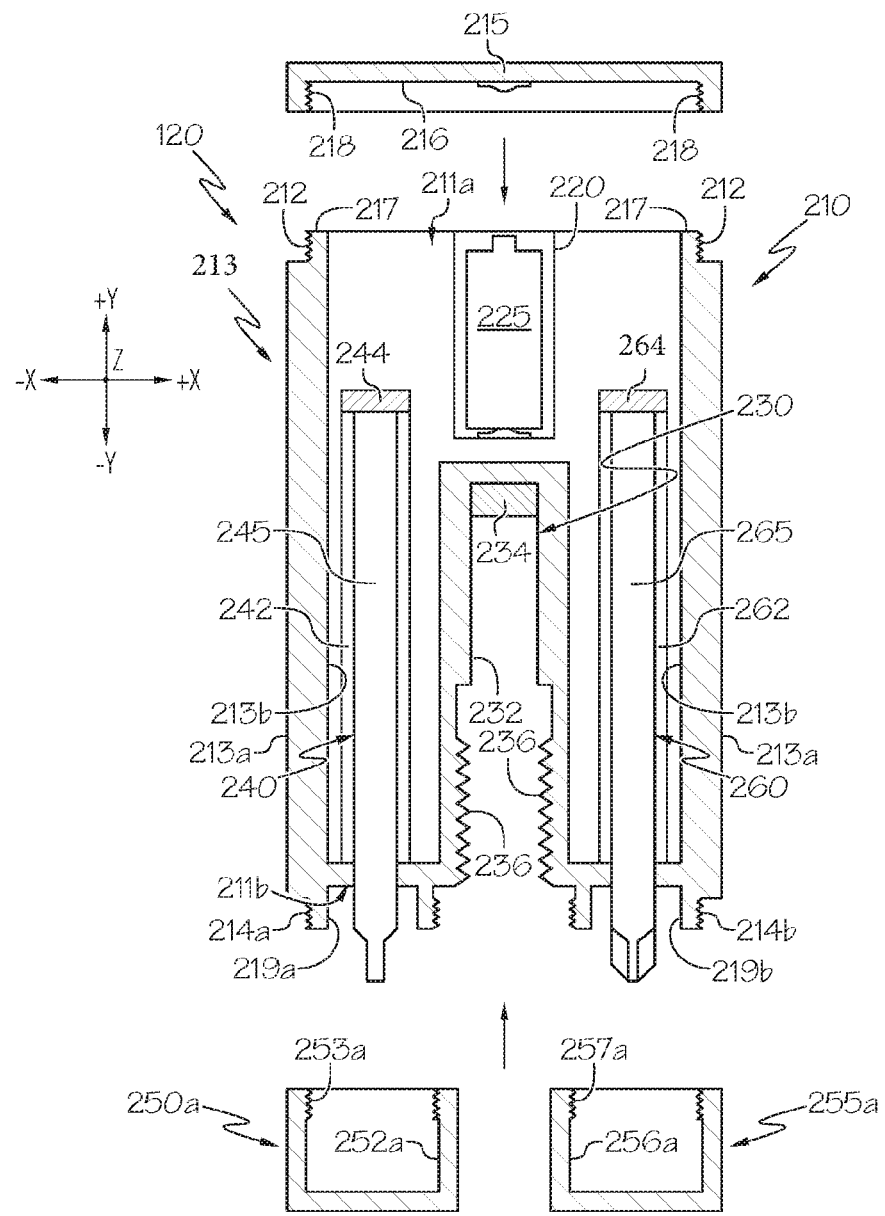
FIG. 2A depicts a side cross-sectional view of the removable gear shift knob of FIG. 1 along a sectional axis A-A, according to one or more embodiments shown and described herein.
Figure 2B:
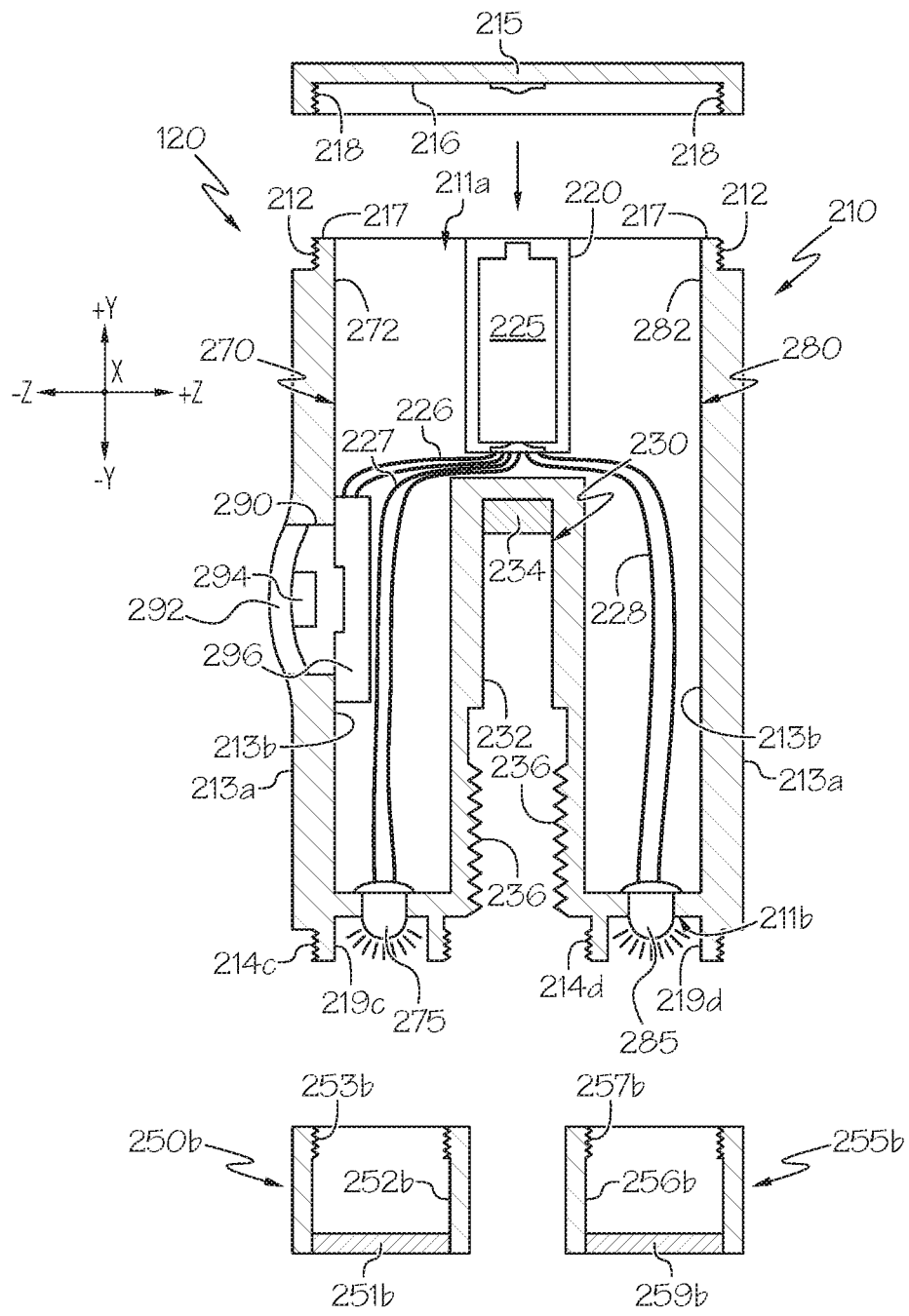
FIG. 2B depicts a side cross-sectional view of the removable gear shift knob of FIG. 1 along a sectional axis B-B, according to one or more embodiments shown and described herein.

Referring to the figures, FIG. 1 depicts a perspective view of a gear shift knob assembly 110 located within a vehicle 100. The gear shift knob assembly 110 has a removable gear shift knob 120 disposed on a gear shift lever 130. FIG. 2A depicts a side cross-sectional view of the removable gear shift knob 120 along a sectional axis A-A, while FIG. 2B depicts a side cross-sectional view of the removable gear shift knob 120 along a sectional axis B-B. HG, 2C depicts a bottom view of the removable gear shift knob 120.

Referring FIG. 2A, the removable gear shift knob 120 has a body 210 concentric with the gear shift lever 130. In some embodiments, the body 210 may be cylindrical or substantially cylindrical in shape. The body 210 may be made from a plastic material, a metal, or an alloy. The body 210 has a central aperture 230 for receiving the gear shift lever 130. The body 210 also has a plurality of compartments 220, 240, 260, 270 (shown in FIG. 2B), and 280 (shown in FIG. 2B) for storing tools and other components, as described in detail below. The body 210 has an upper portion 211a, a lower portion 211b, and a sidewall 213 extending between the upper portion 211a and the lower portion 211b. The sidewall 213 has an outer surface 213a and an inner surface 213b. An upper flange 217 having an externally-threaded surface 212 extends from the body 210 in a generally upward direction (e.g., in the +Y direction of the coordinate axes of FIGS. 2A-2B from the upper portion 211a of the body 210). Lower flanges 219a, 219b (shown in FIG. 2A) and lower flanges 219c, 219d (shown in FIG. 2B) extend from the body 210 downward (e.g., in the −Y direction of the coordinate axes of FIGS. 2A-2B) from the lower portion 211b of the body 210 and arranged around the central aperture 230. The lower flanges 219a, 219b (FIG. 2A) have externally-threaded surfaces 214a, 214b respectively and the lower flanges 219c, 219d (FIG. 2B) have externally-threaded surfaces 214c, 214d respectively. The body 210 may further include an opening 290 in the sidewall 213, which may be shaped, sized, and configured to receive a push button 292 having a mechanical toggle switch 294, which is actuable to activate an electrical switch 296.

Figure 2C:
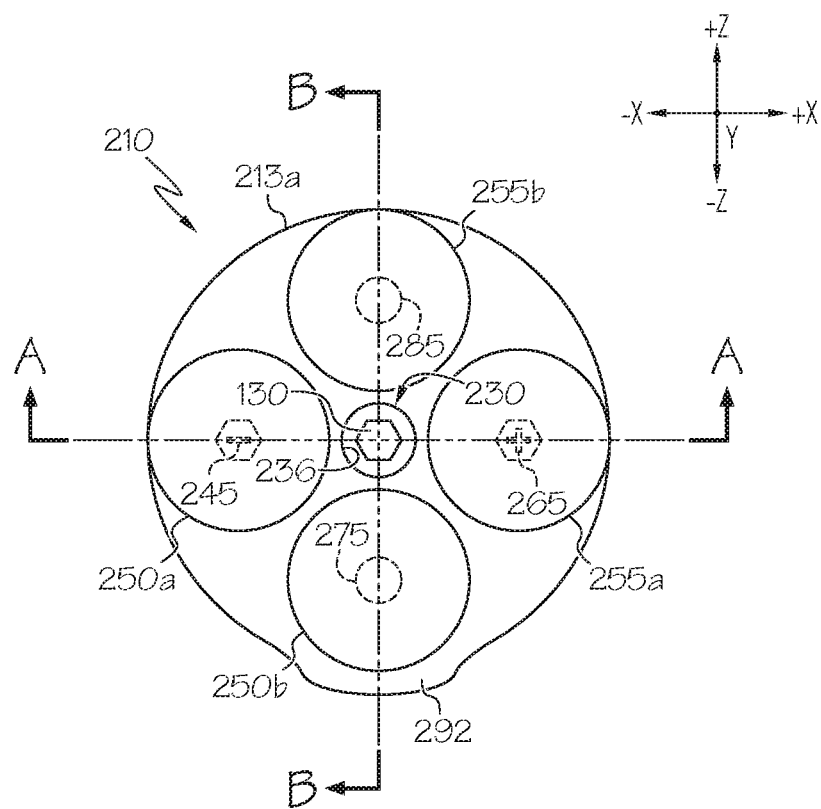
FIG. 2C depicts a bottom view of the removable gear shift knob of FIG. 1 showing the sectional axes A-A and B-B, according to one or more embodiments shown and described herein.

In some embodiments, the central aperture 230 has a circular cross-section (shown in FIG. 2C); however, in other embodiments, the central aperture 230 may have a cross-section that is rectangular or any other polygonal shape (including regular and irregular polygonal shapes). The central aperture 230 has inner walls 232 that are shaped, sized and configured to receive the gear shift lever 130. In some embodiments, the central aperture 230 has an upper surface 234 and an internal threaded surface 236 on the inner walls 232. The internal threaded surface 236 has corresponding threads so that the removable gear shift knob 120 can be mechanically screwed onto the gear shift lever 130.

As shown in FIG. 2A, in some embodiments, a first compartment 220 for storing a battery 225 is positioned above (e.g., toward the +Y direction of the coordinate axes of FIG. 2A) the central aperture 230. The first compartment 220 opens into the upper portion 211a of the body 210. The first compartment 220 is accessible through an upper cover 215, which can threadably engage around the upper flange 217 of the body 210 to cover the first compartment 220 at the upper portion 211a. That is, the upper cover 215 is sized, shaped and dimensioned to threadably engage with the upper flange 217. The upper cover 215 has a top wall 216 and an internally-threaded sidewall surface 218. The top wall 216 is shaped, sized and configured to receive the upper flange 217 while the internally-threaded sidewall surface 218 is shaped, sized and configured to threadably engage around the externally-threaded surface 212 of the upper flange 217.

Still referring to FIG. 2A, a second compartment 240 for storing a first accessory 245 (e.g., a flat head screwdriver bit) is positioned on the left side of the central aperture 230 (e.g., in the −X direction of the coordinate axes of FIG. 2A) along one end of the sectional axis A-A. The second compartment 240 has inner walls 242 and a first gripper 244. The first gripper 244 is configured to hold the first accessory 245 in place within the second compartment 240. In some embodiments, the first gripper 244 may be a permanent magnet configured to magnetically hold the first accessory 245, when the first accessory 245 has magnetic properties.

The second compartment 240 is open at the lower portion 211b of the body 210. The second compartment 240 is accessible through a first lower cover 250a, which can threadably engage with the lower flange 219a to seal the second compartment 240. The first lower cover 250a has a sidewall 252a with an internally-threaded surface 253a that is shaped, sized and configured to threadably engage with the externally-threaded surface 214a of the lower flange 219a to threadably seal the second compartment 240.

A third compartment 260 for storing a second accessory 265 (e.g., a Philips screwdriver bit) is positioned on the right side of the central aperture 230 (e.g., in the +X direction of the coordinate axes of FIG. 2A) along an end of the sectional axis A-A opposite to the end along which the second compartment 240 is positioned. The third compartment 260 has inner walls 262 and a second gripper 264. The second gripper 264 is configured to hold the second accessory 265 in place within the third compartment 260. In some embodiments, the second gripper 264 may be a permanent magnet configured to magnetically hold the second accessory 265, when the second accessory 265 has magnetic properties.

The third compartment 260 is open at the lower portion 211b of the body 210. The third compartment 260 is accessible through a second lower cover 255a, which can threadably, engage with the lower flange 219b to seal the third compartment 260. The second lower cover 255a has a sidewall 256a with an internally-threaded surface 257a that is shaped, sized and configured to threadably engage with the externally-threaded surface 214b of the lower flange 219b to threadably seal the third compartment 260.

Referring to FIG. 2B, a fourth compartment 270 is configured to hold a conducting wire 227 electrically connecting the battery 225 with a light emitting diode (LED) 275 that extends into the lower portion 211b. The fourth compartment 270 is positioned on the left side of the central aperture 230 (in the direction of the coordinate axes of FIG. 2B) along one end of the sectional axis B-B. The fourth compartment 270 has inner walls 272 on which the electrical switch 296 is positioned. The electrical switch 296 is electrically connected to the battery 225 through a wire 226 such that the battery 225 can transmit power to the LED 275 when the electrical switch 296 is activated.

The fourth compartment 270 is open at the lower portion 211b of the body 210. The fourth compartment 270 is accessible through a third lower cover 250b, which can threadably engage with the lower flange 219c to seal the fourth compartment 270. The third lower cover 250b has a sidewall 252b with an internally-threaded surface 253b that is shaped, sized and configured to threadably engage with the externally-threaded surface 214c of the lower flange 219c to threadably seal the fourth compartment 270. The third lower cover 250b also has a lens 251b for transmitting light of the LEI 275. The lens 251b may be made from plastic, glass, polycarbonate, etc. and may have an anti-reflective coating. It is noted that the third lower cover 250b is optional and in some embodiments, the LED 275 remains exposed at all times.

A fifth compartment 280 is configured to hold a conducting wire 228 electrically connecting the battery 225 with a light emitting diode (LED) 285 that extends into the lower portion 211b. The fifth compartment 280 is positioned on the right side of the central aperture 230 (in the +Z direction of the coordinate axes of FIG. 2B) along an end of the sectional axis B-B opposite to the end along which the fourth compartment 270 is positioned. The fifth compartment 280 has inner walls 282.

The fifth compartment 280 is open at the lower portion 211b of the body 210. The fifth compartment 280 is accessible through a fourth lower cover 255b, which can threadably, engage with the lower flange 219d to seal the fifth compartment 280. The fourth lower cover 255b has a sidewall 256b with an internally-threaded surface 257b that is shaped, sized and configured to threadably engage with the externally-threaded surface 214d of the lower flange 219d to threadably seal the fifth compartment 280. The fourth lower cover 255b also has a lens 259b for transmitting light of the LED 285. The lens 259b may be made from plastic, glass, polycarbonate, etc. and may have an anti-reflective coating. It is noted that the fourth lower cover 255b is optional and in some embodiments, the LED 285 remains exposed at all times.

The removable gear shift knob 120 described above can be easily removed from the gear shift lever 130 by unscrewing and reconfigured as a flashlight as well as to access a set of tools for simple repairs. This adds functionality to the removable gear shift knob 120 which is usually a static, single-function, and non-removable part of the vehicle 100 in the prior art. After the removable gear shift knob 120 is unscrewed from the gear shift lever 130, the first lower cover 250a and the second lower cover 255a can be unscrewed to remove the first and the second accessories 245, 265 from the second compartment 240 and the third compartment 260 respectively. In some embodiments, where the accessories 245, 265 are screwdriver bits such as, but not limited to, flat head, Phillips, hex head, and Torx, the screwdriver bits may be placed into an aperture (e.g., the central aperture 230) in the removable gear shift knob 120 to reconfigure the removable gear shift knob 120 as a screwdriver. The third lower cover 250b and the fourth lower cover 255b can be unscrewed to expose the LEDs 275, 285 in the fourth compartment 270 and the fifth compartment 280 respectively such that the removable gear shift knob 120 is reconfigured as a flashlight operated by pressing the push button 292. As noted above, the third lower cover 250b and the fourth lower cover 255b are optional such that in some embodiments, the LEDs 275, 285 remain exposed at all times. In different embodiments, the arrangement of LEDs 275, 285 and the accessories 245, 265 could be changed and quantities of each can be more or less depending on the number of compartments in the space available around the central aperture 230 of the removable gear shift knob 120.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A removable gear shift knob disposed on a gear shift lever in a vehicle, the gear shift knob comprising:
    a body comprising:
        a central aperture that is internally threaded to releasably engage the gear shift lever; and
        a plurality of compartments disposed around the central aperture, wherein an individual compartment of the plurality of compartments holds one or more accessories comprising at least one of one or more screwdriver bits, one or more light emitting diodes (LED), or a battery.

2. The removable gear shift knob of claim 1, wherein the individual compartment is threadably engageable with a cover.

3. The removable gear shift knob of claim 1 further comprising:
    a push button disposed externally on the body, wherein the push button is configured as a switch to turn the battery on or off and the one or more LEDs are electrically coupled to the battery such that the removable gear shift knob can be configured as a flashlight.

4. The removable gear shift knob of claim 1, wherein at least a portion of the plurality of compartments are configured to hold one or more screwdriver bits.

5. The removable gear shift knob of claim 1, wherein the screwdriver bits are secured within the individual compartments by permanent magnets.

6. The removable gear shift knob of claim 1, wherein at least a portion of the plurality of compartments are radially disposed around central aperture.

7. The removable gear shift knob of claim 6, wherein the one or more of the compartments of the portion of the plurality of compartments holds one or more light emitting diodes.

8. The removable gear shift knob of claim 1, further comprising a plurality of removable covers enclosing the plurality of compartments.

* * * * *